United States Patent
Ma et al.

(10) Patent No.: US 11,246,145 B2
(45) Date of Patent: *Feb. 8, 2022

(54) CELL SELECTION AND RESELECTION METHOD AND APPARATUS

(71) Applicant: Huawei Technologies Co., Ltd., Shenzhen (CN)

(72) Inventors: Hui Ma, Shenzhen (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

This patent is subject to a terminal disclaimer.

(21) Appl. No.: 16/748,546

(22) Filed: Jan. 21, 2020

(65) Prior Publication Data
US 2020/0163093 A1 May 21, 2020

Related U.S. Application Data

(63) Continuation of application No. 15/588,109, filed on May 5, 2017, now Pat. No. 10,555,323, which is a (Continued)

(51) Int. Cl.
*H04W 72/08* (2009.01)
*H04W 48/20* (2009.01)
(Continued)

(52) U.S. Cl.
CPC ......... *H04W 72/085* (2013.01); *H04L 5/0048* (2013.01); *H04W 24/08* (2013.01);
(Continued)

(58) Field of Classification Search
CPC ......... H04W 72/0446; H04W 72/0473; H04W 72/085; H04W 24/08; H04W 48/16; H04W 48/20
See application file for complete search history.

(56) References Cited

U.S. PATENT DOCUMENTS

| 8,149,774 B1 | 4/2012 | Pawar et al. |
| 2010/0113021 A1 | 5/2010 | Vare et al. |

(Continued)

FOREIGN PATENT DOCUMENTS

| CN | 1698390 A | 11/2005 |
| CN | 101827407 A | 9/2010 |

(Continued)

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 12), 3GPP, TS36.304, V.12.20, Sep. 2014, 37 pages. (Year: 2014).*

(Continued)

*Primary Examiner* — Jamal Javaid
*Assistant Examiner* — Ryan C Kavleski
(74) *Attorney, Agent, or Firm* — Slater Matsil, LLP

(57) ABSTRACT

Embodiments of the present invention provide a cell selection and reselection method and apparatus, so as to resolve a problem existing in the prior art that repeated reception of data by using an existing cell selection and reselection method causes a waste of resources and an increase in power consumption. The cell selection method includes: measuring signal quality of a cell, and acquiring a coverage class offset value that is preconfigured by a network side for the cell; and selecting a target cell according to the signal quality of the cell and the acquired coverage class offset value of the cell.

11 Claims, 5 Drawing Sheets

801

Measure signal quality of a camping cell in which user equipment is currently located and of neighboring cells of the camping cell, and acquire coverage class compensation values that are preconfigured by a network side for the camping cell and the neighboring cells

802

Select a target cell from the neighboring cells according to the measured signal quality of the camping cell and the neighboring cells, and the acquired coverage class compensation values of the camping cell and the neighboring cells

Related U.S. Application Data continuation of application No. PCT/CN2014/090499, filed on Nov. 6, 2014.

(51) Int. Cl.

| | | |
|---|---|---|
| *H04L 5/00* | (2006.01) | |
| *H04W 24/08* | (2009.01) | |
| *H04W 72/04* | (2009.01) | |
| *H04W 48/16* | (2009.01) | |

(52) U.S. Cl.
CPC ....... *H04W 48/20* (2013.01); *H04W 72/0446* (2013.01); *H04W 72/0473* (2013.01); *H04W 48/16* (2013.01)

(56) References Cited

U.S. PATENT DOCUMENTS

| | | |
|---|---|---|
| 2012/0188884 A1 | 7/2012 | Simonsson et al. |
| 2012/0252368 A1 | 10/2012 | Edara |
| 2012/0276909 A1 | 11/2012 | Xiao et al. |
| 2013/0223235 A1 | 8/2013 | Hu et al. |
| 2014/0295851 A1* | 10/2014 | Kubota ........... H04W 36/00835 455/441 |
| 2014/0314645 A1 | 10/2014 | Ofoli et al. |
| 2016/0174125 A1 | 6/2016 | Kobayashi et al. |
| 2016/0330654 A1 | 11/2016 | Jung et al. |

FOREIGN PATENT DOCUMENTS

| | | |
|---|---|---|
| CN | 101965058 A | 2/2011 |
| CN | 102098715 A | 6/2011 |
| CN | 102123478 A | 7/2011 |
| CN | 103098521 A | 5/2013 |
| CN | 103249092 A | 8/2013 |
| CN | 103391590 A | 11/2013 |
| CN | 103959878 A | 7/2014 |
| EP | 2750456 A1 | 7/2014 |
| EP | 3101937 A1 | 12/2016 |

OTHER PUBLICATIONS

3rd Generation Partnership Project;Technical Specification Group Radio Access Network; Evolved Universal Terrestrial Radio Access (E-UTRA); Radio Resource Control (RRC); Protocol specification (Release 12), 3GPP TS 36.331 V12.3.0 (Sep. 2014), 377 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.3.0 (Sep. 2014), 215 pages.

CATT, "Discussion on Mobility Support for Low Complexity MTC UEs and MTC Coverage Enhancement", 3GPP TSG RAN WG2 Meeting #84, R2-134040, Nov. 11-15, 2013, 4 pages, San Francisco, USA.

3rd Generation Partnership Project; Technical Specification Group Radio Access Network; Evolved Universal Terrestrial Radio Access (E-UTRA); User Equipment (UE) procedures in idle mode (Release 12), 3GPP TS 36.304, V.12.20, Sep. 2014, 37 pages.

Sony, "Enhanced Coverage Issues," 3GPP TSG-RAN WG2 Meeting #85, R2-140825, Prague, Czech Republic, Feb. 10-14, 2014, total 9 pages.

Vodafone Group, "Considerations of mobility aspects for and MTC enhanced coverage mode operation," 3GPP TSG RAN WG2 #85, R2-140700, Prague, Czech Republic, Feb. 10-14, 2014, 2 pages.

TSG-RAN WG2, "CRs to 25.304 and 25.331 Rel-5 (and Rel-6) on Cell selection and reselection parameters," TSG-RAN Meeting #26, RP-040526, Athens, Greece, Dec. 8-10, 2004, 30 pages.

Wang, Y., "Research on Cell Selection and Reselection in LTE-A Het-Net System," Beijing University of Posts and Telecommunications, Sep. 2011, 1 page.

\* cited by examiner

CELL SELECTION AND RESELECTION METHOD AND APPARATUS

CROSS-REFERENCE TO RELATED APPLICATIONS

This application is a continuation of U.S. patent application Ser. No. 15/588,109, filed on May 5, 2017, which is a continuation of International Application No. PCT/CN2014/090499, filed on Nov. 6, 2014. All of the afore-mentioned patent applications are hereby incorporated by reference in their entireties.

TECHNICAL FIELD

The present invention relates to the field of communications technologies, and in particular, to a cell selection and reselection method and apparatus.

BACKGROUND

Machine to machine (M2M), that is, machine type communication (MTC), refers to information and data transmission from one machine to another by using a wireless network. Machine to machine is widely applied to multiple fields, including intelligent transportation, a building control system, a smart home control system, a video surveillance system, industrial monitoring and measurement, and the like. As the fourth revolution subsequent to computer, Internet, and mobile communication network in the information industry, the machine-to-machine industry is a development direction for a future network. A typical network structure is shown in FIG. 1.

A deployment location of an M2M device, such as a sensor, an electricity meter, and goods, may be in a place with poor coverage, such as a corner or a basement. It is predicted that by 2022, a quantity of user equipment of this coverage type will reach 1.55 billion. To enable these devices that are located in an area with poor coverage to successfully use an M2M network, coverage of the M2M network needs to be better than that of a current cellular network. Therefore, the coverage of the M2M network needs to be increased by 20 dB.

To meet a requirement of a coverage increment of 20 dB, a narrowband system enhances cell coverage in a manner of time-domain spectrum-spreading. A cell in which an enhanced coverage area exists may be referred to as an enhanced coverage cell, and a cell in which an enhanced coverage area does not exist may be referred to as a normal cell. In an enhanced coverage cell shown in FIG. 2, an area A is a normal coverage area of the enhanced coverage cell, and spectrum spreading is not required (referred to as 1×) for the area A; an area B/C is an enhanced coverage area of the enhanced coverage cell, and a spectrum spreading manner needs to be used for the area B/C, where a spread spectrum multiple used in the area B/C is 8 or 64 (referred to as 8× or 64×), respectively. In cells that need to be selected by user equipment (UE), both an enhanced coverage cell and a normal cell may exist. A measured cell that includes both an enhanced coverage cell and a normal cell is referred to as a multi-coverage-class cell. A measured cell that includes only a normal cell is referred to as a single-coverage-class cell.

Due to network coverage enhancement, an overlapping area certainly exists between a normal cell and an enhanced coverage cell. For example, as shown in FIG. 3, a cell in which an area A and an area B are located is an enhanced coverage cell, where the area A is a normal coverage area, and the area B is an enhanced coverage area. For example, a spread spectrum multiple used in B is 8 (referred to as 8×). A cell in which an area C is located is a normal cell. When the UE is located in an area covered by both the area B and the area C, and a spectrum spreading manner needs to be used in the enhanced coverage area B, where for example, the spread spectrum multiple used in B is 8 (referred to as 8×), data needs to be repeatedly received or measured eight times when the user equipment camps on the area B. A cell selection and reselection method specific to an enhanced coverage cell does not exist in the prior art. In a case shown in FIG. 3 in which an enhanced coverage cell and a normal coverage cell exist, according to an existing cell selection and reselection method, an enhanced coverage cell may be directly selected and data is repeatedly received, which causes a waste of resources and an increase in power consumption.

SUMMARY

Embodiments of the present invention provide a cell selection and reselection method and apparatus, so as to resolve a problem existing in the prior art that repeated reception of data by using an existing cell selection and reselection method causes a waste of resources and an increase in power consumption.

According to a first aspect, an embodiment of the present invention provides a cell selection apparatus. The apparatus includes an acquiring unit, configured to measure signal quality of a cell, and acquire a coverage class offset value that is preconfigured by a network side for the cell. The apparatus also includes a processing unit, configured to select a target cell according to the signal quality of the cell that is measured by the acquiring unit and the coverage class offset value of the cell that is acquired by the acquiring unit.

With reference to the first aspect, in a first possible implementation manner of the first aspect, the processing unit is specifically configured to: if the signal quality of the cell that is acquired by the acquiring unit is greater than a signal quality threshold of the cell, use the cell as a cell that meets a coverage class cell selection condition, where the signal quality threshold of the cell is determined according to a minimum received signal threshold of the cell and the coverage class offset value of the cell; and use the cell that meets the coverage class cell selection condition as the target cell.

With reference to the first possible implementation manner of the first aspect, in a second possible implementation manner of the first aspect, the processing unit is specifically configured to: when the signal quality of the cell includes reference signal receive power value of the cell and a reference signal received quality value of the cell, use a cell that meets the following coverage class cell selection condition as the target cell:

$S_{rxlev} > 0$, and $S_{qual} > 0$, where $S_{rxlev} = Q_{rxlevmeas} - (Q_{rxlevmin} + Q_{rxlevminoffse} + Q_{coverageclassoffset}) - P_{compensation}$; and $S_{qual} = Q_{qualmeas} - (Q_{qualmin} + Q_{qualminoffset} + Q_{coverageclassoffset})$; where Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents a coverage class offset value that is preconfigured by the network side for the cell, $P_{compensation}$ represents a maximum value between ($P_{EMAX}-P_{PowerClass}$) and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, ($Q_{qualmin}+Q_{qualminoffset}+Q_{coverageclassoffset}$) represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for the cell.

With reference to any one of the first aspect and the first and the second possible implementation manners of the first aspect, in a third possible implementation manner of the first aspect, the acquiring unit is specifically configured to: when the cell includes an enhanced coverage cell in which an enhanced coverage area exists and a normal cell in which an enhanced coverage area does not exist, acquire a coverage class offset value of the normal cell that is zero or a default value.

With reference to any one of the first aspect and the first to the third possible implementation manners of the first aspect, in a fourth possible implementation manner of the first aspect, the apparatus further includes: a determining unit, configured to: before the acquiring unit acquires the coverage class offset value that is preconfigured by the network side for the cell, determine that the user equipment supports camping on the enhanced coverage cell in which an enhanced coverage area exists.

According to a second aspect, an embodiment of the present invention provides a cell reselection apparatus. The apparatus includes: an acquiring unit, configured to measure signal quality of a camping cell in which user equipment is currently located and of neighboring cells of the camping cell, and acquire coverage class offset values that are preconfigured by a network side for the camping cell and the neighboring cells. The apparatus also includes a processing unit, configured to select a target cell from the neighboring cells according to the signal quality of the camping cell and the neighboring cells that is measured by the acquiring unit and the coverage class offset values of the camping cell and the neighboring cells that are acquired by the acquiring unit.

With reference to the second aspect, in a first possible implementation manner of the second aspect, the processing unit is specifically configured to select a neighboring cell that meets a specified condition from the neighboring cells; for each selected neighboring cell, determine whether the neighboring cell meets a coverage class cell reselection condition, where the coverage class cell reselection condition is that a signal quality level of the neighboring cell is greater than a signal quality level of the camping cell within a specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell; and use a neighboring cell, in the selected neighboring cells, that meets the coverage class cell reselection condition as the target cell.

With reference to the first possible implementation manner of the second aspect, in a second possible implementation manner of the second aspect, the processing unit is configured to use a neighboring cell, in the selected cells, that meets the following coverage class cell reselection condition as the target cell:

$R_n > R_s$ within the specified time interval; where $$R_s = Q_{meas,s} + Q_{Hyst} - Q_{coverageclassoffset,s};\text{ and}$$

$$R_n = Q_{meas,n} - Q_{offset} - Q_{coverageclassoffset,n};\text{ where}$$

$R_n$ represents a signal quality level of the neighboring cell; and $R_s$ represents a signal quality level of the camping cell;

$Q_{meas,s}$ represents a reference signal receive power value in the signal quality of the camping cell, $Q_{Hyst}$ represents a hysteresis value of the reference signal receive power value of the camping cell, and $Q_{coverageclassoffset,s}$ represents the coverage class offset value preconfigured by the network side for the camping cell; and $Q_{meas,n}$ represents a reference signal receive power value in the signal quality of the neighboring cell, $Q_{offset}$ represents an offset value between the camping cell in which the user equipment is currently located and the neighboring cell, and $Q_{coverageclassoffset,n}$ represents the coverage class offset value preconfigured by the network side for the neighboring cell.

With reference to the first or the second possible implementation manner of the second aspect, in a third possible implementation manner of the second aspect, the processing unit is specifically configured to: select a neighboring cell whose signal quality is greater than a minimum received signal threshold of a cell from the neighboring cells; or select a neighboring cell whose signal quality is greater than a signal quality threshold of a cell from the neighboring cells, where the signal quality threshold of the cell is determined according to a minimum received signal threshold of the cell and a coverage class offset value of the cell.

With reference to any one of the second aspect and the first to the third possible implementation manners of the second aspect, in a fourth possible implementation manner of the second aspect, the apparatus further includes: a receiving unit, configured to: before the acquiring unit measures the signal quality of the neighboring cells, and acquires the coverage class offset values that are preconfigured by the network side for the neighboring cells, receive a neighboring cell list sent by the network side, where the neighboring cell list carries a neighboring cell identifier, where the acquiring unit is specifically configured to measure signal quality of a neighboring cell corresponding to each neighboring cell identifier carried in the neighboring cell list received by the receiving unit, and acquire a coverage class offset value that is preconfigured by the network side for the neighboring cell corresponding to each neighboring cell identifier carried in the neighboring cell list.

With reference to any one of the second aspect and the first to the fourth possible implementation manners of the second aspect, in a fifth possible implementation manner of the second aspect, the acquiring unit is further configured to acquire reselection priority information configured by the network side for each neighboring cell, where a reselection priority of an enhanced coverage cell in which an enhanced coverage area exists is lower than a reselection priority of a normal cell in which an enhanced coverage area does not exist, and the enhanced coverage cell and the normal cell are included in the neighboring cells; and the processing unit is specifically configured to select the target cell from the neighboring cells according to the signal quality of the camping cell and the neighboring cells that is measured by the acquiring unit, the coverage class offset values of the camping cell and the neighboring cells that are acquired by the acquiring unit, and the reselection priority information of the neighboring cells.

With reference to the fifth possible implementation manner of the second aspect, in a sixth possible implementation manner of the second aspect, the processing unit is specifically configured to: when it is determined that the neighboring cells include neighboring cells whose reselection priorities are higher than a reselection priority of the camping cell in which the user equipment is currently located, select a neighboring cell, from the determined neighboring cells, that meets a coverage class cell selection condition as the target cell, where the coverage class cell selection condition meets that the signal quality of the neighboring cell is greater than a signal quality threshold of the neighboring cell, and the signal quality threshold of the neighboring cell is determined according to a minimum received signal threshold of the neighboring cell and a coverage class offset value of the neighboring cell; or if it is determined that no neighboring cell whose reselection priority is higher than a reselection priority of the camping cell meets a coverage class cell selection condition or it is determined that the neighboring cells do not include a neighboring cell whose reselection priority is higher than a reselection priority of the camping cell in which the user equipment is currently located, and when it is determined that the signal quality of the camping cell is lower than a specified threshold within a specified time interval, select a neighboring cell that meets the coverage class cell selection condition from neighboring cells whose reselection priorities are not higher than the reselection priority of the camping cell, and when the selected neighboring cell meets the coverage class cell reselection condition, use the neighboring cell as the target cell, where the coverage class cell reselection condition is that the signal quality level of the neighboring cell is greater than the signal quality level of the camping cell within the specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell.

With reference to the third or the sixth possible implementation manner of the second aspect, in a seventh possible implementation manner of the second aspect, the processing unit is specifically configured to: when signal quality of a cell includes a reference signal receive power value of the cell and a reference signal received quality value of the cell, and the neighboring cell whose signal quality is greater than the signal quality threshold of the cell is selected from the neighboring cells, select a neighboring cell that meets the following coverage class cell selection condition from the neighboring cells:

$S_{rxlev} > 0$, and $S_{qual} > 0$, where $S_{rxlev} = Q_{rxlevmeas} - (Q_{rxlevmin} + Q_{rxlevminoffse} + Q_{coverageclassoffset}) - P_{compensation}$; and $S_{qual} = Q_{qualmeas} - (Q_{qualmin} + Q_{qualminoffset} + Q_{coverageclassoffset})$; where Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents the coverage class offset value that is preconfigured by the network side for each cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for each cell.

With reference to any one of the second aspect and the first to the seventh possible implementation manners of the second aspect, in an eighth possible implementation manner of the second aspect, the acquiring unit is specifically configured to: when the cells include an enhanced coverage cell in which an enhanced coverage area exists and a normal cell in which an enhanced coverage area does not exist, acquire a coverage class offset value of the normal cell that is zero or a default value.

With reference to any one of the second aspect and the first to the eighth possible implementation manners of the second aspect, in a ninth possible implementation manner of the second aspect, the apparatus further includes: a determining unit, configured to: before the acquiring unit acquires the coverage class offset values that are preconfigured by the network side for the neighboring cells, determine that the user equipment supports camping on the enhanced coverage cell in which an enhanced coverage area exists.

According to a third aspect, an embodiment of the present invention further provides a cell selection apparatus. The apparatus includes a configuration unit, configured to configure a coverage class offset value for each cell. The apparatus also includes a sending unit, configured to send the coverage class offset value that is configured by the configuration unit for each cell to user equipment, where the coverage class offset value is used by the user equipment to perform cell selection/reselection.

According to a fourth aspect, an embodiment of the present invention provides a cell selection method, where the method includes: measuring signal quality of a cell, and acquiring a coverage class offset value that is preconfigured by a network side for each cell; and selecting a target cell according to the measured signal quality of the cell and the acquired coverage class offset value of each cell.

With reference to the fourth aspect, in a first possible implementation manner of the fourth aspect, the selecting a target cell according to the measured signal quality of the cell and the acquired coverage class offset value of the cell includes: if the signal quality of the cell is greater than a signal quality threshold of the cell, using the cell as a cell that meets a coverage class cell selection condition, where the signal quality threshold of the cell is determined according to a minimum received signal threshold of the cell and the coverage class offset value of the cell; and using the cell that meets the coverage class cell selection condition as the target cell.

With reference to the first possible implementation manner of the fourth aspect, in a second possible implementation manner of the fourth aspect, the signal quality of the cell includes reference signal receive power value of the cell and a reference signal received quality value of the cell, and the coverage class cell selection condition meets the following formulas:

$S_{rxlev} > 0$, and $S_{qual} > 0$, where $$S_{rxlev} = Q_{rxlevmeas} - (Q_{rxlevmin} + Q_{rxlevminoffse} + Q_{coverageclassoffset}) - P_{compensation};\text{ and}$$

$$S_{qual} = Q_{qualmeas} - (Q_{qualmin} + Q_{qualminoffset} + Q_{coverageclassoffset});\text{ where}$$

Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents a coverage class offset value that is preconfigured by the network side for the cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for the cell.

With reference to any one of the fourth aspect and the first and the second possible implementation manners of the fourth aspect, in a third possible implementation manner of the fourth aspect, when the cell includes an enhanced coverage cell in which an enhanced coverage area exists and a normal cell in which an enhanced coverage area does not exist, the acquired coverage class offset value of the normal cell is zero or a default value.

With reference to any one of the fourth aspect and the first to the third possible implementation manners of the fourth aspect, in a fourth possible implementation manner of the fourth aspect, before the acquiring a coverage class offset value that is preconfigured by a network side for a cell, the method further includes: determining that the user equipment supports camping on the enhanced coverage cell in which an enhanced coverage area exists.

According to a fifth aspect, an embodiment of the present invention provides a cell reselection method. The method includes measuring signal quality of a camping cell in which user equipment is currently located and of neighboring cells of the camping cell, and acquiring coverage class offset values that are preconfigured by a network side for the camping cell and the neighboring cells. The method also includes selecting a target cell from the neighboring cells according to the measured signal quality of the camping cell and the neighboring cells, and the acquired coverage class offset values of the camping cell and the neighboring cells.

With reference to the fifth aspect, in a first possible implementation manner of the fifth aspect, the selecting a target cell from the neighboring cells according to the measured signal quality of the camping cell and the neighboring cells, and the acquired coverage class offset values of the camping cell and the neighboring cells includes: selecting a neighboring cell that meets a specified condition from the neighboring cells; for each selected neighboring cell, determining whether the neighboring cell meets a coverage class cell reselection condition, where the coverage class cell reselection condition is that a signal quality level of the neighboring cell is greater than a signal quality level of the camping cell within a specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell; and using a neighboring cell, in the selected neighboring cells, that meets the coverage class cell reselection condition as the target cell.

With reference to the first possible implementation manner of the fifth aspect, in a second possible implementation manner of the fifth aspect, the coverage class cell reselection condition meets the following formula:

$R_n > R_s$ within the specified time interval; where $$R_s = Q_{meas,s} + Q_{Hyst} - Q_{coverageclassoffset,s};\text{ and}$$

$$R_n = Q_{meas,n} - Q_{offset} - Q_{coverageclassoffset,n};\text{ where}$$

$R_n$ represents a signal quality level of the neighboring cell; and Rs represents a signal quality level of the camping cell;

$Q_{meas,s}$ represents a reference signal receive power value in the signal quality of the camping cell, $Q_{Hyst}$ represents a hysteresis value of the reference signal receive power value of the camping cell, and $Q_{coverageclassoffset,s}$ represents the coverage class offset value preconfigured by the network side for the camping cell; and $Q_{meas,n}$ represents a reference signal receive power value in the signal quality of the neighboring cell, $Q_{offset}$ represents an offset value between the camping cell in which the user equipment is currently located and the neighboring cell, and $Q_{coverageclassoffset,n}$ represents the coverage class offset value preconfigured by the network side for the neighboring cell.

With reference to the first or the second possible implementation manner of the fifth aspect, in a third possible implementation manner of the fifth aspect, the selecting a neighboring cell that meets a specified condition from the neighboring cells includes: selecting a neighboring cell whose signal quality is greater than a minimum received signal threshold of a cell from the neighboring cells; or selecting a neighboring cell whose signal quality is greater than a signal quality threshold of a cell from the neighboring cells, where the signal quality threshold of the cell is determined according to a minimum received signal threshold of the cell and a coverage class offset value of the cell.

With reference to any one of the fifth aspect and the first to the third possible implementation manners of the fifth aspect, in a fourth possible implementation manner of the fifth aspect, before the measuring signal quality of neighboring cells, and acquiring coverage class offset values that are preconfigured by a network side for the neighboring cells, the method further includes: receiving a neighboring cell list sent by the network side, where the neighboring cell list carries a neighboring cell identifier, where the measuring signal quality of neighboring cells, and acquiring coverage class offset values that are preconfigured by a network side for the neighboring cells specifically includes: measuring signal quality of a neighboring cell corresponding to each neighboring cell identifier carried in the received neighboring cell list, and acquiring a coverage class offset value that is preconfigured by the network side for the neighboring cell corresponding to each neighboring cell identifier carried in the neighboring cell list.

With reference to any one of the fifth aspect and the first to the fourth possible implementation manners of the fifth aspect, in a fifth possible implementation manner of the fifth aspect, the method further includes: acquiring reselection priority information configured by the network side for each neighboring cell, where a reselection priority of an enhanced coverage cell in which an enhanced coverage area exists is lower than a reselection priority of a normal cell in which an enhanced coverage area does not exist, and the enhanced coverage cell and the normal cell are included in the neighboring cells; and the selecting a target cell from the neighboring cells according to the measured signal quality of the camping cell and the neighboring cells, and the acquired coverage class offset values of the camping cell and the neighboring cells specifically includes: selecting the target cell from the neighboring cells according to the measured signal quality of the camping cell and the neighboring cells, the acquired coverage class offset values of the camping cell and the neighboring cells, and the reselection priority information of the neighboring cells.

With reference to the fifth possible implementation manner of the fifth aspect, in a sixth possible implementation manner of the fifth aspect, the selecting the target cell from the neighboring cells according to the measured signal quality of the camping cell and the neighboring cells, the acquired coverage class offset values of the camping cell and the neighboring cells, and the reselection priority information of the neighboring cells includes: when it is determined that the neighboring cells include neighboring cells whose reselection priorities are higher than a reselection priority of the camping cell in which the user equipment is currently located, selecting a neighboring cell, from the determined neighboring cells, that meets a coverage class cell selection condition as the target cell, where the coverage class cell selection condition meets that the signal quality of the neighboring cell is greater than a signal quality threshold of the neighboring cell, and the signal quality threshold of the neighboring cell is determined according to a minimum received signal threshold of the neighboring cell and a coverage class offset value of the neighboring cell; or if it is determined that no neighboring cell whose reselection priority is higher than a reselection priority of the camping cell meets a coverage class cell selection condition or it is determined that the neighboring cells do not include a neighboring cell whose reselection priority is higher than a reselection priority of the camping cell in which the user equipment is currently located, and when it is determined that the signal quality of the camping cell is lower than a specified threshold within a specified time interval, selecting a neighboring cell that meets the coverage class cell selection condition from neighboring cells whose reselection priorities are not higher than the reselection priority of the camping cell, and when the selected neighboring cell meets the coverage class cell reselection condition, using the neighboring cell as the target cell, where the coverage class cell reselection condition is that the signal quality level of the neighboring cell is greater than the signal quality level of the camping cell within the specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell.

With reference to the third or the sixth possible implementation manner of the fifth aspect, in a seventh possible implementation manner of the fifth aspect, signal quality of the cell includes a reference signal receive power value of the cell and a reference signal received quality value of the cell, and the selecting a neighboring cell whose signal quality is greater than a signal quality threshold of the cell from the neighboring cells includes: selecting a neighboring cell that meets the following formulas from the neighboring cells:

$S_{rxlev} > 0$, and $S_{qual} > 0$, where $$S_{rxlev} = Q_{rxlevmeas} - (Q_{rxlevmin} + Q_{rxlevminoffse} + Q_{coverageclassoffset}) - P_{compensation};\text{ and}$$

$$S_{qual} = Q_{qualmeas} - (Q_{qualmin} + Q_{qualminoffset} + Q_{coverageclassoffset});\text{ where}$$

Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents the coverage class offset value that is preconfigured by the network side for each cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for each cell.

With reference to any one of the fifth aspect and the first to the seventh possible implementation manners of the fifth aspect, in an eighth possible implementation manner of the fifth aspect, when the cells include an enhanced coverage cell in which an enhanced coverage area exists and a normal cell in which an enhanced coverage area does not exist, the acquired coverage class offset value that is preconfigured by the network side for the normal cell is zero or a default value.

With reference to any one of the fifth aspect and the first to the eighth possible implementation manners of the fifth aspect, in a ninth possible implementation manner of the fifth aspect, the method further includes: determining that the user equipment supports camping on the enhanced coverage cell in which an enhanced coverage area exists.

According to a sixth aspect, an embodiment of the present invention provides a cell selection method. The method includes configuring a coverage class offset value for each cell. The method also includes sending the coverage class offset value that is configured for each cell to user equipment, where the coverage class offset value is used by the user equipment to perform cell selection/reselection.

By using the solutions provided in the embodiments of the present invention, a coverage class offset value is preconfigured by a network side for each cell, and user equipment selects a target cell from neighboring cells according to the measured coverage class offset value of each cell and an acquired coverage class offset value that is preconfigured by the network side for each neighboring cell. Preconfiguring the coverage class offset value by the network side for each cell can ensure that the user equipment selects, with relatively low power consumption, a cell with relatively good signal quality for camping.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
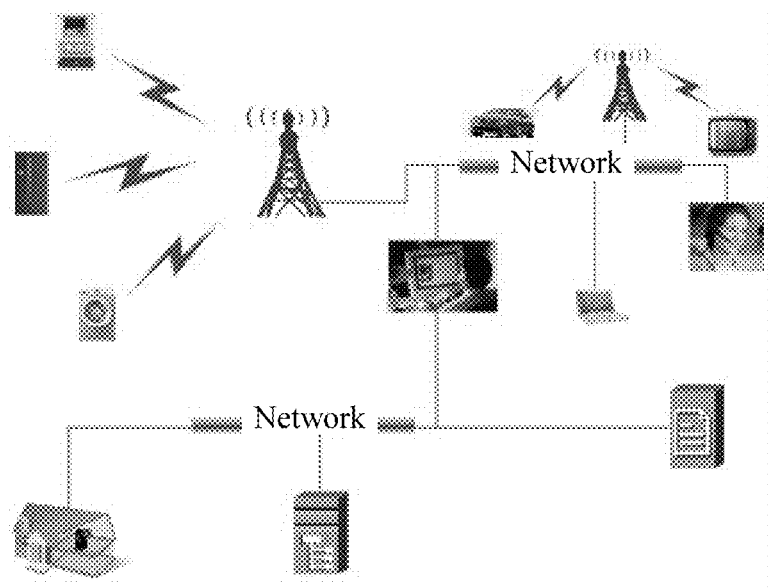
FIG. 1 is a structural diagram of an M2M network in the prior art.
Figure 2:
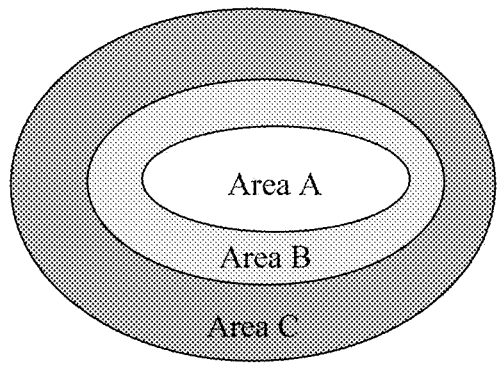
FIG. 2 is a schematic diagram of M2M coverage enhancement in the prior art.
Figure 3:
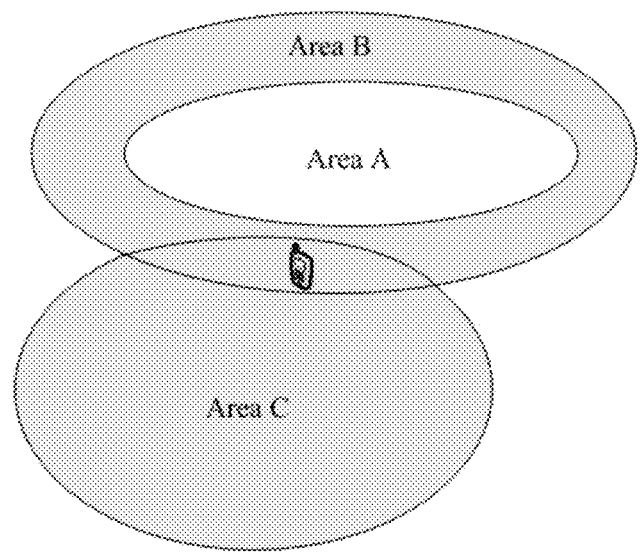
FIG. 3 is a schematic diagram of a multi-coverage-class cell in the prior art.

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an orthogonal frequency division multiple access (OFDMA) system, a single-carrier FDMA (SC-FDMA) system, a general packet radio service (GPRS) system, a Long Term Evolution (LTE) system, and other communications systems.

In addition, an enhanced coverage cell described in this specification refers to a cell in which an enhanced coverage area exists, and a normal cell refers to a cell in which an enhanced coverage area does not exist. The character "/" in this specification generally indicates an "or" relationship between the associated objects.

The embodiments of the present invention provide a cell selection and reselection method and a cell selection and reselection apparatus. The methods and the apparatuses are based on a same invention concept. Because a problem-solving principle of the methods is similar to that of the apparatuses, mutual reference may be made between implementation of the apparatuses and the methods, and no repeated description is provided.

The embodiments of the present invention provide a cell selection and reselection method and apparatus that can be used in a multi-coverage-class cell. A coverage class offset value is preconfigured by a network side for each cell, and user equipment selects a target cell from neighboring cells according to a measured coverage class offset value of each cell and an acquired coverage class offset value that is preconfigured by the network side for each neighboring cell. Preconfiguring the coverage class offset value by the network side for each cell can ensure that the user equipment selects, with relatively low power consumption, a cell with relatively good signal quality for camping.

During network connection, the UE first selects a public land mobile network (PLMN). The UE performs cell searching in the selected PLMN, and after a cell is found, selects a cell for camping. After camping on the cell, by listening to a system message, the UE measures a current camping cell and neighboring cells of the camping cell according to a neighboring cell measurement rule and a cell reselection rule, and reselects a cell with good signal quality for camping.

Figure 4:
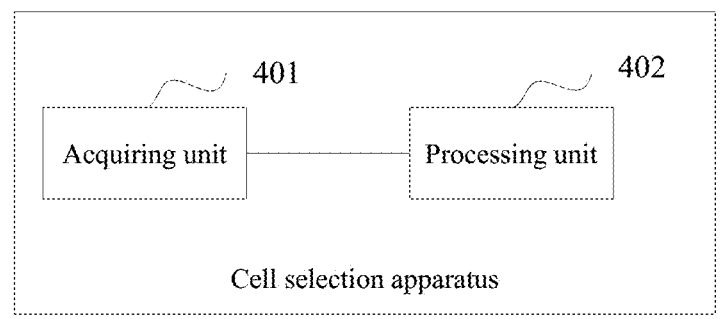
FIG. 4 is a schematic diagram of a cell selection apparatus according to an embodiment of the present invention.
Figure 5:
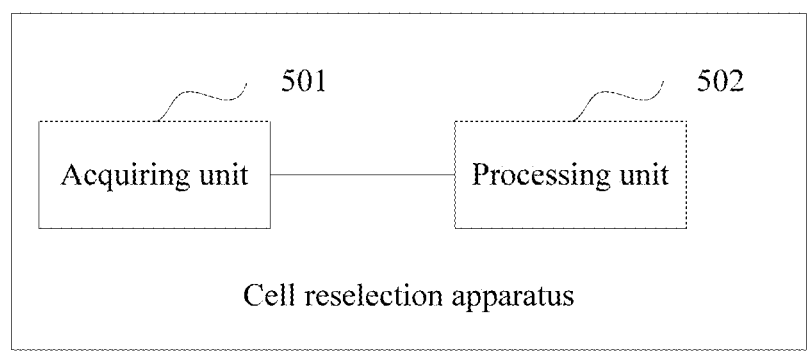
FIG. 5 is a schematic diagram of a cell reselection apparatus according to an embodiment of the present invention.

An embodiment of the present invention provides a cell selection apparatus. As shown in FIG. 4, the apparatus is disposed on a user equipment side, and the apparatus includes an acquiring unit 401, configured to measure signal quality of a cell, and acquire a coverage class offset value that is preconfigured by a network side for the cell. The apparatus also includes a processing unit 402, configured to select a target cell according to the signal quality of the cell that is measured by the acquiring unit 401 and the coverage class offset value of the cell that is acquired by the acquiring unit 401.

By using the solution provided in this embodiment of the present invention, a coverage class offset value is preconfigured by the network side for each cell, and the processing unit 402 of the user equipment selects the target cell from neighboring cells according to the coverage class offset value of each cell that is measured by the acquiring unit 401 and a coverage class offset value that is preconfigured by the network side for each neighboring cell and that is acquired by the acquiring unit 401. Preconfiguring the coverage class offset value by the network side for each cell can ensure that the user equipment selects, with relatively low power consumption, a cell with relatively good signal quality for camping.

Specifically, the acquiring unit 401 may measure the signal quality of the cell before acquiring the coverage class offset value that is preconfigured by the network side for the cell, or after acquiring the coverage class offset value that is preconfigured by the network side for the cell, or at the same time of acquiring the coverage class offset value that is preconfigured by the network side for the cell, which is not specifically limited in this embodiment of the present invention.

The coverage class offset value that is preconfigured by the network side for the cell may be configured according to cases such as a bearer service of the cell or load on the cell during network planning and network optimization.

The foregoing cell may include both an enhanced coverage cell in which an enhanced coverage area exists and a normal cell in which an enhanced coverage area does not exist, or may include only a normal cell.

Optionally, the network side may preconfigure a coverage class offset value only for an enhanced coverage cell, and may not configure a coverage class offset value for a normal cell, that is, a coverage class offset value configured for a normal cell is a default value. Certainly, a coverage class offset value preconfigured for a normal cell may be zero. The acquiring unit 401 is specifically configured to: when the cell includes an enhanced coverage cell in which an enhanced coverage area exists and a normal cell in which an enhanced coverage area does not exist, acquire a coverage class offset value of the normal cell that is zero or a default value.

In one implementation manner, the processing unit 402 is specifically configured to: if the signal quality of the cell that is acquired by the acquiring unit 401 is greater than a signal quality threshold of the cell, use the cell as a cell that meets a coverage class cell selection condition, where the signal quality threshold of the cell is determined according to a minimum received signal threshold of the cell and the coverage class offset value of the cell; and use the cell that meets the coverage class cell selection condition as the target cell.

Specifically, after determining a first cell that meets the coverage class cell selection condition, the processing unit 402 may not perform determining on another cell, and directly camp on the cell.

Specifically, the measured signal quality of the cell may include a reference signal receive power (RSRP) value of the cell and a reference signal received quality (RSRQ) value of the cell. The signal quality threshold of the cell includes an RSRP power threshold of the cell and an RSRQ quality threshold of the cell, and the minimum received signal threshold includes a minimum required receive level in the cell and a minimum required quality level in the cell. Alternatively, the measured signal quality of the cell may include only a reference signal receive power value of the cell, and the signal quality threshold of the cell includes an RSRP power threshold of the cell.

To ensure that a possibility of camping on a normal cell during cell selection is as great as possible, it is required to meet that the RSRP value of the cell is greater than the power threshold of the cell, or meet that the RSRP value of the cell is greater than the power threshold of the cell and the RSRQ value of the cell is greater than the quality threshold of the cell. The reference signal receive power threshold of the cell is determined according to the minimum required receive level in the cell and the coverage class offset value of the cell, and the reference signal received quality threshold of the cell is determined according to the minimum required quality level in the cell and the coverage class offset value of the cell. The processing unit 402 is specifically configured to use a cell that meets the following coverage class cell selection condition as the target cell:

$S_{rxlev} > 0$, and $S_{qual} > 0$, where $S_{rxlev} = Q_{rxlevmeas} - (Q_{rxlevmin} + Q_{rxlevminoffse} + Q_{coverageclassoffset}) - P_{compensation}$; and $S_{qual} = Q_{qualmeas} - (Q_{qualmin} + Q_{qualminoffset} + Q_{coverageclassoffset})$; where Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents a coverage class offset value that is preconfigured by the network side for the cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for the cell.

In one implementation manner, the apparatus further includes: a determining unit, configured to: before the acquiring unit 401 acquires the coverage class offset value that is preconfigured by the network side for the cell, determine that the user equipment supports camping on an enhanced coverage cell in which an enhanced coverage area exists.

Specifically, before the acquiring unit 401 acquires the coverage class offset value that is preconfigured by the network side for each cell, the determining unit determines that the user equipment supports camping on an enhanced coverage cell, and the processing unit 402 subsequently selects the cell that meets the coverage class cell selection condition as the target cell. When the determining unit determines that camping on an enhanced coverage cell is not supported, the acquiring unit 401 may measure signal quality of each cell, and the processing unit 402 may subsequently select the target cell according to a cell selection condition (a criterion S) provided in the prior art.

An embodiment of the present invention further provides a cell reselection apparatus. The apparatus includes an acquiring unit 501, configured to measure signal quality of a camping cell in which user equipment is currently located and of neighboring cells of the camping cell, and acquire coverage class offset values that are preconfigured by a network side for the camping cell and the neighboring cells. Optionally, the acquiring unit 501 is specifically configured to: when the cells include an enhanced coverage cell in which an enhanced coverage area exists and a normal cell in which an enhanced coverage area does not exist, acquire a coverage class offset value of the normal cell that is zero or a default value. The apparatus also includes a processing unit 502, configured to select a target cell from the neighboring cells according to the signal quality of the camping cell and the neighboring cells that is measured by the acquiring unit 501 and the coverage class offset values of the camping cell and the neighboring cells that are acquired by the acquiring unit 501.

By using the solution provided in this embodiment of the present invention, a coverage class offset value is preconfigured by the network side for each cell, the processing unit 502 of the user equipment selects the target cell from the neighboring cells according to the signal quality of the camping cell and the neighboring cells that is measured by the acquiring unit 501, and the coverage class offset values of the camping cell and the neighboring cells that are acquired by the acquiring unit 501. Preconfiguring the coverage class offset value by the network side for each cell can ensure that the user equipment selects, with relatively low power consumption, a cell with relatively good signal quality for camping.

In one implementation manner, the processing unit 502 is specifically configured to select a neighboring cell that meets a specified condition from the neighboring cells; for each selected neighboring cell, determine whether the neighboring cell meets a coverage class cell reselection condition, where the coverage class cell reselection condition is that a signal quality level of the neighboring cell is greater than a signal quality level of the camping cell within a specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell; and use a neighboring cell, in the selected neighboring cells, that meets the coverage class cell reselection condition as the target cell.

When using the determined neighboring cell that meets the coverage class cell reselection condition as the target cell, the processing unit 502 may sort a signal quality level of the determined neighboring cell that meets the coverage class reselection condition, and use a neighboring cell whose signal quality level is the largest as a target cell.

In one implementation manner, the processing unit 502 is specifically configured to use a neighboring cell, in the selected cells, that meets the following coverage class cell reselection condition as the target cell:

$R_n > R_s$ within the specified time interval; where $R_s = Q_{meas,s} + Q_{Hyst} - Q_{coverageclassoffset,s}$; and $R_n = Q_{meas,n} - Q_{offset} - Q_{coverageclassoffset,n}$; where $R_n$ represents a signal quality level of the neighboring cell; and Rs represents a signal quality level of the camping cell;

$Q_{meas,s}$ represents a reference signal receive power value in the signal quality of the camping cell, $Q_{Hyst}$ represents a hysteresis value of the reference signal receive power value of the camping cell, and $Q_{coverageclassoffset,s}$ represents the coverage class offset value preconfigured by the network side for the camping cell; and $Q_{meas,n}$ represents a reference signal receive power value in signal quality of the neighboring cell, $Q_{offset}$ represents an offset value between the camping cell in which the user equipment is currently located and the neighboring cell, and $Q_{coverageclassoffset,n}$ represents the coverage class offset value preconfigured by the network side for the neighboring cell.

That the processing unit 502 selects a neighboring cell that meets a specified condition from the neighboring cells may be specifically implemented in the following manners.

In a first implementation manner, the processing unit 502 selects a neighboring cell whose signal quality is greater than a minimum received signal threshold of the cell from the neighboring cells.

Specifically, in the first implementation manner, a cell selection condition (that is, a criterion S) may be implemented with reference to the description about the criterion S in the foregoing cell selection method, and details are not described herein.

In a second implementation manner, the processing unit 502 selects a neighboring cell whose signal quality is greater than a signal quality threshold of the cell from the neighboring cells, where the signal quality threshold of the cell is determined according to a minimum received signal threshold of the cell and a coverage class offset value of the cell.

Based on any one of the foregoing cell reselection method embodiments, optionally, the apparatus further includes a receiving unit, configured to: before the acquiring unit 501 measures the signal quality of the neighboring cells, and acquires the coverage class offset values that are preconfigured by the network side for the neighboring cells, receive a neighboring cell list sent by the network side, where the neighboring cell list carries a neighboring cell identifier, where the acquiring unit 501 is specifically configured to measure signal quality of a neighboring cell corresponding to each neighboring cell identifier carried in the received neighboring cell list, and acquire a coverage class offset value that is preconfigured by the network side for the neighboring cell corresponding to each neighboring cell identifier carried in the neighboring cell list.

Based on any one of the foregoing cell reselection method embodiments, optionally, the acquiring unit 501 is further configured to acquire reselection priority information configured by the network side for each neighboring cell, where a reselection priority of an enhanced coverage cell in which an enhanced coverage area exists is lower than a reselection priority of a normal cell in which an enhanced coverage area does not exist, and the enhanced coverage cell and the normal cell are included in the neighboring cells. The processing unit 502 is specifically configured to select the target cell from the neighboring cells according to the signal quality of the camping cell and the neighboring cells that is measured by the acquiring unit 501, the coverage class offset values of the camping cell and the neighboring cells that are acquired by the acquiring unit 501, and the reselection priority information of the neighboring cells.

In one implementation manner, the user equipment may further use a reselection priority of a cell as a selection parameter for selecting a target cell.

The acquiring unit 501 may acquire reselection priorities of the neighboring cells in one of the following manners.

In a first implementation manner, the network side may send the reselection priorities of the neighboring cells to the user equipment by using a broadcast message. Specifically, a parameter cellReselectionPriority may be set, and the reselection priorities of the neighboring cells may be sent to the user equipment by broadcasting a system information block (SIB) in a system message, so that the acquiring unit 501 of the user equipment receives reselection priority information of the neighboring cells, and the processing unit 502 selects the target cell according to the reselection priority information of the neighboring cells that is acquired by the acquiring unit 501.

In a second implementation manner, a reselection priority is configured by the network side for each neighboring cell, and when the user equipment releases a radio resource, the reselection priority of each neighboring cell is sent to the user equipment by using a radio resource control (RRC) connection release message, so that the acquiring unit 501 of the user equipment receives reselection priority information of the neighboring cells, and the processing unit 502 selects the target cell according to the reselection priority information of the neighboring cells that is acquired by the acquiring unit 501.

In a third implementation manner, reselection priority information may be carried in the neighboring cell list that is sent by the network side to the user equipment, so that the user equipment receives the reselection priority information of the neighboring cells, and the processing unit 502 selects the target cell according to the reselection priority information of the neighboring cells that is acquired by the acquiring unit 501.

The acquiring unit 501 of the user equipment acquires, in the foregoing manners, reselection priority information configured by the network side for each neighboring cell, where a reselection priority of an enhanced coverage cell in which an enhanced coverage area exists is lower than a reselection priority of a normal cell in which an enhanced coverage area does not exist, and the enhanced coverage cell and the normal cell are included in the neighboring cells; and the processing unit 502 of the user equipment selects the target cell according to the measured signal quality of the camping cell and the neighboring cells, the acquired coverage class offset values of the camping cell and the neighboring cells, and the reselection priority information of the neighboring cells.

Specifically, the processing unit 502 is specifically configured to: when it is determined that the neighboring cells include neighboring cells whose reselection priorities are higher than a reselection priority of the camping cell in which the user equipment is currently located, select a neighboring cell, from the determined neighboring cells, that meets a coverage class cell selection condition as the target cell, where the coverage class cell selection condition meets that signal quality of the neighboring cell is greater than a signal quality threshold of the neighboring cell, and the signal quality threshold of the neighboring cell is determined according to a minimum received signal threshold of the neighboring cell and a coverage class offset value of the neighboring cell; or if it is determined that no neighboring cell whose reselection priority is higher than a reselection priority of the camping cell meets a coverage class cell selection condition or it is determined that the neighboring cells do not include a neighboring cell whose reselection priority is higher than a reselection priority of the camping cell in which the user equipment is currently located, and when it is determined that the signal quality of the camping cell is lower than a specified threshold within a specified time interval, select a neighboring cell that meets the coverage class cell selection condition from neighboring cells whose reselection priorities are not higher than the reselection priority of the camping cell, and when the selected neighboring cell meets the coverage class cell selection condition, use the neighboring cell as the target cell, where the coverage class cell reselection condition is that the signal quality level of the neighboring cell is greater than the signal quality level of the camping cell within the specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell.

It should be noted that, after the reselection priority of the enhanced coverage cell included in the neighboring cells is set to be lower than the reselection priority of the normal cell included in the neighboring cells, cell reselection may be subsequently performed according to a cell reselection solution provided in the prior art. Even though a coverage class offset value is not preconfigured for a neighboring cell, it may be ensured that the user equipment selects, with relatively low power consumption, a cell with relatively good signal quality for camping.

Specifically, the processing unit 502 is specifically configured to: when signal quality of a cell includes a reference signal receive power value of the cell and a reference signal received quality value of the cell, and the neighboring cell whose signal quality is greater than the signal quality threshold of the cell is selected from the neighboring cells, select a neighboring cell that meets the following coverage class cell selection condition from the neighboring cells:

$S_{rxlev} > 0$, and $S_{qual} > 0$, where $$S_{rxlev} = Q_{rxlevmeas} - (Q_{rxlevmin} + Q_{rxlevminoffse} + Q_{coverageclassoffset}) - P_{compensation}; \text{ and}$$

$$S_{qual} = Q_{qualmeas} - (Q_{qualmin} + Q_{qualminoffset} + Q_{coverageclassoffset}); \text{ where}$$

Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents the coverage class offset value that is preconfigured by the network side for each cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for each cell.

In one implementation manner, the apparatus further includes: a determining unit, configured to: before the acquiring unit acquires the coverage class offset values that are preconfigured by the network side for the neighboring cells, determine that the user equipment supports camping on an enhanced coverage cell in which an enhanced coverage area exists. If the determining unit determines that camping on an enhanced coverage cell is not supported, the user equipment may subsequently select the target cell by using a cell reselection condition provided in the prior art.

Figure 6:
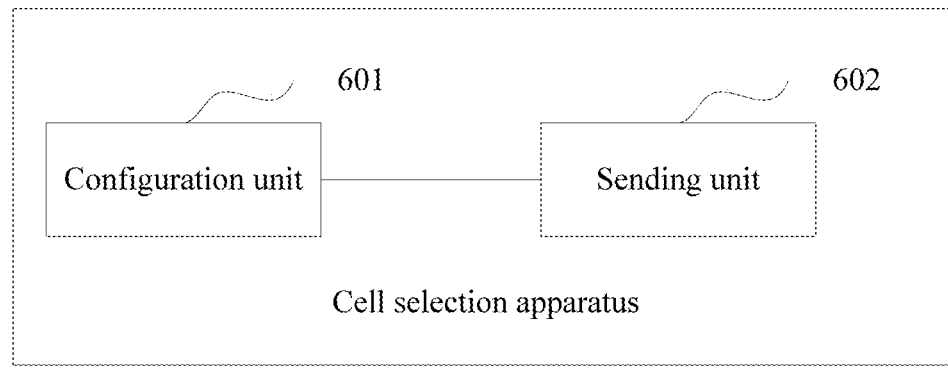
FIG. 6 is a schematic diagram of another cell selection apparatus according to an embodiment of the present invention.

An embodiment of the present invention further provides a cell selection apparatus. The method is executed by a network side. As shown in FIG. 6, the apparatus includes: a configuration unit 601, configured to configure a coverage class offset value for each cell; and a sending unit 602, configured to send the coverage class offset value that is configured by the configuration unit 601 for each cell to user equipment, where the coverage class offset value is used by the user equipment to perform cell selection/reselection.

Optionally, the configuration unit 601 on the network side may preconfigure a coverage class offset value only for an enhanced coverage cell in the cells, and may not configure a coverage class offset value for a normal cell, that is, a coverage class offset value configured for a normal cell is a default value. Certainly, a coverage class offset value preconfigured for a normal cell may be zero. Certainly, a coverage class offset value may be preconfigured for each cell according to cases such as a bearer service of each cell or load on each cell during network planning and network optimization.

Specifically, the configuration unit 601 is further configured to configure a reselection priority for each cell, and the sending unit 602 may send the reselection priorities to the user equipment in the following manners, so that the user equipment receives reselection priority information of the neighboring cells, and selects a target cell according to the reselection priority information of the neighboring cells.

In a first implementation manner, the sending unit 602 on the network side may send the reselection priorities of the neighboring cells to the user equipment by using a broadcast message. Specifically, a parameter cellReselectionPriority may be set, and the reselection priorities of the neighboring cells may be sent to the user equipment by broadcasting a system information block (SIB) in a system message.

In a second implementation manner, a reselection priority is configured by the configuration unit 601 on the network side for each neighboring cell, and is sent, by the sending unit 602 when the user equipment releases a radio resource, to the user equipment by using a radio resource control (RRC) connection release message.

In a third implementation manner, the configuration unit 601 on the network side configures a neighboring cell list for the user equipment, and the sending unit 601 sends the neighboring cell list that is configured by the configuration unit 601 to the user equipment, where the neighboring cell list carries a neighboring cell identifier and reselection priority information.

The user equipment acquires, in the foregoing manner, priority information configured by the network side for each neighboring cell, where a reselection priority of an enhanced coverage cell included in the neighboring cells is lower than a reselection priority of a normal cell included in the neighboring cells. The user equipment selects the target cell according to measured signal quality of a camping cell, measured signal quality of the neighboring cells, acquired offset values of the camping cell and the neighboring cells, and the reselection priority information of the neighboring cells.

Figure 7:
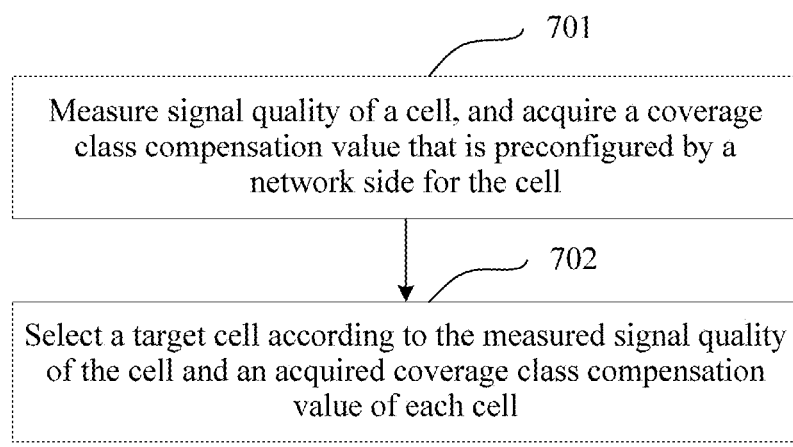
FIG. 7 is a flowchart of a cell selection method according to an embodiment of the present invention.

An embodiment of the present invention provides a cell selection method. As shown in FIG. 7, the method may be executed by user equipment, and the method includes the following steps.

Step 701: Measure signal quality of a cell, and acquire a coverage class offset value that is preconfigured by a network side for the cell.

Specifically, measuring the signal quality of the cell may be performed before acquiring the coverage class offset value that is preconfigured by the network side for the cell, or after acquiring the coverage class offset value that is preconfigured by the network side for the cell, or at the same time of acquiring the coverage class offset value that is preconfigured by the network side for the cell, which is not specifically limited in this embodiment of the present invention.

The coverage class offset value that is preconfigured by the network side for the cell may be configured according to cases such as a bearer service of each cell or load on each cell during network planning and network optimization.

The foregoing cell may include both an enhanced coverage cell in which an enhanced coverage area exists and a normal cell in which an enhanced coverage area does not exist, or may include only a normal cell.

Optionally, the network side may preconfigure a coverage class offset value only for an enhanced coverage cell, and may not configure a coverage class offset value for a normal cell, that is, a coverage class offset value configured for a normal cell is a default value. Certainly, a coverage class offset value preconfigured for a normal cell may be zero.

Step 702: Select a target cell according to the measured signal quality of the cell and the acquired coverage class offset value of the cell.

In one implementation manner, after the signal quality of the cell is measured, and the coverage class offset value that is preconfigured by the network side for the cell is acquired, the target cell may be specifically selected in the following manner: when it is determined that the signal quality of the cell is greater than a signal quality threshold of the cell, using the cell as a cell that meets a coverage class cell selection condition, where the signal quality threshold of the cell is determined according to a minimum received signal threshold of the cell and the coverage class offset value of the cell; and using the cell that meets the coverage class cell selection condition as the target cell.

Specifically, after determining a first cell that meets the coverage class cell selection condition, the user equipment may not perform determining on another cell, and directly camp on the cell.

Specifically, the measured signal quality of the cell may include a reference signal receive power (RSRP) value of the cell and a reference signal received quality (RSRQ) value of the cell. The signal quality threshold of the cell includes an RSRP power threshold of the cell and an RSRQ quality threshold of the cell, and the minimum received signal threshold includes a minimum required receive level in the cell and a minimum required quality level in the cell. Alternatively, the measured signal quality of the cell may include only a reference signal receive power value of the cell, and the signal quality threshold of the cell includes an RSRP power threshold of the cell.

To ensure that a possibility of camping on a normal cell during cell selection is as great as possible, it is required to meet that the RSRP value of the cell is greater than the power threshold of the cell, or meet that the RSRP value of the cell is greater than the power threshold of the cell and the RSRQ value of the cell is greater than the quality threshold of the cell. The reference signal receive power threshold of the cell is determined according to the minimum required receive level in the cell and the coverage class offset value of the cell, and the reference signal received quality threshold of the cell is determined according to the minimum required quality level in the cell and the coverage class offset value of the cell.

Specifically, the coverage class cell selection condition may meet the following formulas:

$S_{rxlev} > 0$, and $S_{qual} > 0$, where $$S_{rxlev} = Q_{rxlevmeas} - (Q_{rxlevmin} + Q_{rxlevminoffse} + Q_{coverageclassoffset}) - P_{compensation};\ \text{and}$$

$$S_{qual} = Q_{qualmeas} - (Q_{qualmin} + Q_{qualminoffset} + Q_{coverageclassoffset});\ \text{where}$$

$(Q_{rxlevmin} + Q_{rxlevminoffse} + Q_{coverageclassoffset}) - P_{compensation}$ represents a reference signal receive power threshold of a cell, and $Q_{qualmin} + Q_{qualminoffset} + Q_{coverageclassoffset}$ represents a reference signal received quality threshold of the cell.

Specific descriptions about the parameter values in the foregoing formula are shown in the following table 1:

TABLE 1

| | |
|---|---|
| $S_{qual}$ | Cell selection quality, applicable only to a frequency division duplex (FDD) cell |
| $S_{rxlev}$ | Cell selection receive level |
| $Q_{coverageclassoffset}$ | Coverage class offset value preconfigured by a network side for a cell |

TABLE 1-continued

| | |
|---|---|
| $Q_{qualmeas}$ | Measured cell RSRQ, applicable only to an FDD cell |
| $Q_{rxlevmeas}$ | Measured cell RSRP |
| $Q_{qualmin}$ | Minimum required quality level in the cell, applicable only to an FDD cell |
| $Q_{rxlevmin}$ | Minimum required receive level in the cell |
| $P_{compensation}$ | $\text{Max}(P_{EMAX} - P_{PowerClass}, 0)$, an optional value |
| $P_{EMAX}$ | Maximum transmit power of UE performing uplink transmission |
| $P_{PowerClass}$ | Maximum radio-frequency transmit power of the UE |
| $Q_{rxlevminoffse}$ | Offset of $Q_{relevmin}$, an optional value |
| $Q_{qualminoffset}$ | Offset of $Q_{qualmin}$, an optional value |

In one implementation manner, before acquiring the coverage class offset value that is preconfigured by the network side for the cell, the user equipment determines that the user equipment supports camping on an enhanced coverage cell, and subsequently selects the cell that meets the coverage class cell selection condition as the target cell. When it is determined that camping on an enhanced coverage cell is not supported, the user equipment may measure the signal quality of the cell, and may subsequently select the target cell according to a cell selection condition (a criterion S) provided in the prior art.

The signal quality of the cell may include a reference signal receive power value of the cell and a reference signal received quality value of the cell, and the cell selection condition (that is, the criterion S) meets the following formulas:

$S_{rxlev} > 0$, and $S_{qual} > 0$, where $S_{rxlev} = Q_{rxlevmeas} - (Q_{rxlevmin} + Q_{rxlevminoffse}) - P_{compensation}$; and $S_{qual} = Q_{qualmeas} - (Q_{qualmin} + Q_{qualminoffset})$.

Specific descriptions about the parameter values in the foregoing formula are shown in the following table 2:

TABLE 2

| | |
|---|---|
| $S_{qual}$ | Cell selection quality, applicable only to an FDD cell |
| $S_{rxlev}$ | Cell selection receive level |
| $Q_{qualmeas}$ | Measured cell RSRQ, applicable only to an FDD cell |
| $Q_{rxlevmeas}$ | Measured cell RSRP |
| $Q_{qualmin}$ | Minimum required quality level in a cell, applicable only to an FDD cell |
| $Q_{rxlevmin}$ | Minimum required receive level in the cell |
| $P_{compensation}$ | $\text{Max}(P_{EMAX} - P_{PowerClass}, 0)$ |
| $P_{EMAX}$ | Maximum transmit power of UE performing uplink transmission |
| $P_{PowerClass}$ | Maximum radio-frequency transmit power of the UE |
| $Q_{rxlevminoffse}$ | Offset of $Q_{relevmin}$ |
| $Q_{qualminoffset}$ | Offset of $Q_{qualmin}$ |

Figure 8:
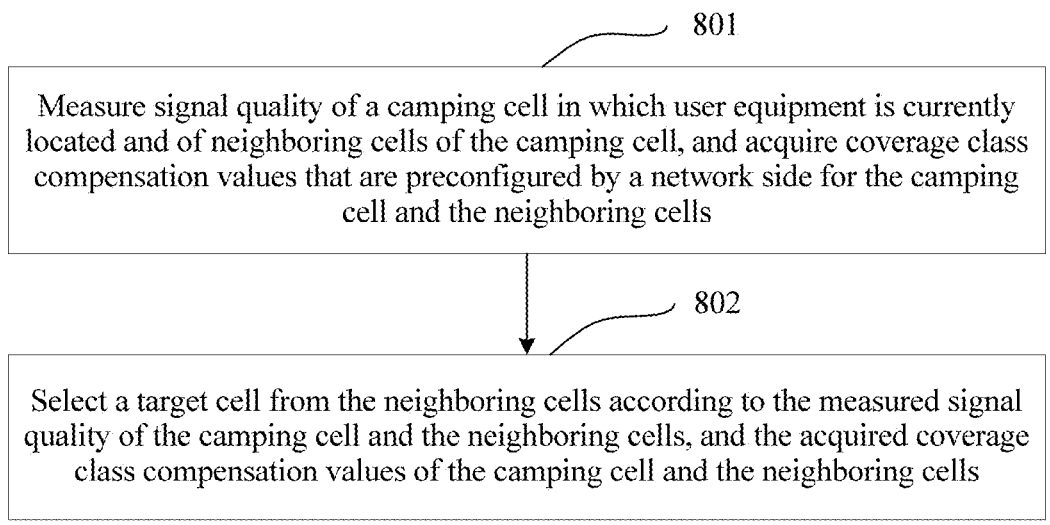
FIG. 8 is a flowchart of a cell reselection method according to an embodiment of the present invention.

An embodiment of the present invention further provides a cell reselection method. As shown in FIG. 8, the method includes the following steps.

Step 801: Measure signal quality of a camping cell in which user equipment is currently located and of neighboring cells of the camping cell, and acquire coverage class offset values that are preconfigured by a network side for the camping cell and the neighboring cells.

Measuring the signal quality of the camping cell and acquiring the coverage class offset value that is preconfigured by the network side for the camping cell may be performed before, after, or at the same time of measuring the signal quality of the neighboring cells and acquiring the coverage class offset values that are preconfigured by the network side for the neighboring cells. A specific sequence of the steps is not specifically limited in this embodiment of the present invention.

Optionally, the network side may preconfigure a coverage class offset value only for an enhanced coverage cell, and may not configure a coverage class offset value for a normal cell, that is, a coverage class offset value configured for a normal cell is a default value. Certainly, a coverage class offset value preconfigured for a normal cell may be zero. Certainly, a coverage class offset value may be preconfigured for each cell according to cases such as a bearer service of each cell or load on each cell during network planning and network optimization.

Specifically, the network side may configure a neighboring cell list for the user equipment, where the neighboring cell list carries a neighboring cell identifier. Then, the user equipment may acquire information about the neighboring cells by receiving the neighboring cell list sent by the network side. Specifically, the user equipment measures signal quality of a neighboring cell corresponding to each neighboring cell identifier carried in the received neighboring cell list and acquires a coverage class offset value that is preconfigured by the network side for the neighboring cell corresponding to each neighboring cell identifier carried in the neighboring cell list.

Step 802: Select a target cell from the neighboring cells according to the measured signal quality of the camping cell and the neighboring cells, and the acquired coverage class offset values of the camping cell and the neighboring cells.

The selecting a target cell from the neighboring cells according to the measured signal quality of the camping cell and the neighboring cells, and the acquired coverage class offset values of the camping cell and the neighboring cells may be specifically implemented in the following manner: first, selecting a neighboring cell that meets a specified condition from the neighboring cells; for each selected neighboring cell, determining whether the neighboring cell meets a coverage class cell reselection condition, where the coverage class cell reselection condition is that a signal quality level of the neighboring cell is greater than a signal quality level of the camping cell within a specified time interval, the signal quality level of the neighboring cell is determined according to the signal quality of the neighboring cell and the coverage class offset value of the neighboring cell, and the signal quality level of the camping cell is determined according to the signal quality of the camping cell and the coverage class offset value of the camping cell; and using a determined neighboring cell, in the selected neighboring cells, that meets the coverage class cell reselection condition as the target cell.

The using a determined neighboring cell that meets the coverage class cell reselection condition as the target cell may be sorting a signal quality level of the determined neighboring cell that meets the coverage class reselection condition, and using a neighboring cell whose signal quality level is the largest as a target cell.

In one implementation manner, the selecting a neighboring cell that meets a specified condition from the neighboring cells may be specifically implemented in the following manners:

In a first implementation manner, a neighboring cell that meets a cell selection condition is selected from the neighboring cells, where the cell selection condition meets that signal quality of the cell is greater than a minimum received signal threshold of the cell.

Specifically, in the first implementation manner, the cell selection condition (that is, a criterion S) may be implemented with reference to the description about the criterion S in the foregoing cell selection method, and details are not described herein.

In a second implementation manner, a neighboring cell that meets a coverage class cell selection condition is selected from the neighboring cells. The coverage class cell selection condition meets that signal quality of a cell is greater than a signal quality threshold of the cell, where the signal quality threshold of the cell is determined according to a minimum received signal threshold of the cell and a coverage class offset value of the cell.

The coverage class cell selection condition described in the second implementation manner may be implemented with reference to the coverage class cell selection condition in the foregoing cell selection method, and details are not described herein.

In one implementation manner, the signal quality of the cell includes a reference signal receive power value of the cell, and the coverage class cell reselection condition may meet the following formula:

$R_n > R_s$ within the specified time interval; where $$R_s = Q_{meas,s} + Q_{Hyst} - Q_{coverageclassoffset,s}; \text{ and}$$

$$R_n = Q_{meas,n} - Q_{offset} - Q_{coverageclassoffset,n}.$$

Descriptions about the parameters in the foregoing formula are as follows:

$Q_{meas}$ represents an RSRP value of a cell, where $Q_{meas,s}$ is specific to a camping cell in which user equipment is currently located, and $Q_{meas,n}$ is specific to a neighboring cell of the camping cell.

$Q_{Hyst}$ represents a hysteresis value of RSRP of the camping cell.

$Q_{offset}$ represents an offset value between the camping cell in which user equipment is currently located and the neighboring cell.

$Q_{coverageclassoffset,s}$ represents a coverage class offset value preconfigured by a network side for the camping cell, and $Q_{coverageclassoffset,n}$ represents a coverage class offset value that is preconfigured by the network side for the neighboring cell.

In one implementation manner, the user equipment may further use a reselection priority of a cell as a selection parameter for selecting a target cell.

The user equipment may acquire reselection priorities of the neighboring cells in one of the following manners.

In a first implementation manner, the network side may send the reselection priorities of the neighboring cells to the user equipment by using a broadcast message. Specifically, a parameter cellReselectionPriority may be set, and the reselection priorities of the neighboring cells may be sent to the user equipment by broadcasting a system information block (SIB) in a system message, so that the user equipment receives reselection priority information of the neighboring cells, and selects the target cell according to the reselection priority information of the neighboring cells.

In a second implementation manner, a reselection priority is configured by the network side for each neighboring cell, and when the user equipment releases a radio resource, the reselection priority of each neighboring cell is sent to the user equipment by using a radio resource control (RRC) connection release message, so that the user equipment receives reselection priority information of the neighboring cells, and selects the target cell according to the reselection priority information of the neighboring cells.

In a third implementation manner, the reselection priority information may be carried in the neighboring cell list that is sent by the network side to the user equipment, so that the user equipment receives reselection priority information of the neighboring cells, and selects the target cell according to the reselection priority information of the neighboring cells.

The user equipment acquires, in the foregoing manner, the reselection priority information configured by the network side for each neighboring cell, where a reselection priority of an enhanced coverage cell in which an enhanced coverage area exists is lower than a reselection priority of a normal cell in which an enhanced coverage area does not exist, and the enhanced coverage cell and the normal cell are included in the neighboring cells; and the user equipment selects the target cell according to the measured signal quality of the camping cell and the neighboring cells, the acquired coverage class offset values of the camping cell and the neighboring cells, and the reselection priority information of the neighboring cells.

Specifically, during cell reselection, when the user equipment determines that a neighboring cell whose reselection priority is higher than a reselection priority of the camping cell in which the user equipment is currently located exists in the neighboring cells, the user equipment measures signal quality of the determined neighboring cell, and when the neighboring cell meets the coverage class cell selection condition, uses the neighboring cell as the target cell. If determining that no neighboring cell whose reselection priority is higher than a reselection priority of the camping cell meets the coverage class cell selection condition, the user equipment measures whether the signal quality of the camping cell is lower than a specified threshold within a specified time interval; when it is measured that the signal quality of the camping cell is lower than the specified threshold within the specified time interval, selects a neighboring cell that meets the coverage class cell selection condition from neighboring cells whose reselection priorities are not higher than the reselection priority of the camping cell; and when the selected neighboring cell meets the coverage class cell reselection condition, uses the neighboring cell as the target cell. If determining that a reselection priority of each cell is not higher than a reselection priority of the camping cell in which the user equipment is located, the user equipment measures whether the signal quality of the camping cell is lower than a specified threshold within a specified time interval; when it is measured that the signal quality of the camping cell is lower than the specified threshold within the specified time interval, selects a neighboring cell that meets the coverage class cell selection condition from the neighboring cells; and when the selected neighboring cell meets the coverage class cell reselection condition, uses the neighboring cell as the target cell.

It should be noted that, after the reselection priority of the enhanced coverage cell included in the neighboring cells is set to be lower than the reselection priority of the normal cell included in the neighboring cells, cell reselection may be subsequently performed according to a cell reselection solution provided in the prior art. Even though a coverage class offset value is not preconfigured for a neighboring cell, it may be ensured that the user equipment selects, with relatively low power consumption, a cell with relatively good signal quality for camping.

In one implementation manner, before the acquiring coverage class offset values that are preconfigured by a network side for the neighboring cells, the method may further include: determining that the user equipment supports camping on an enhanced coverage cell in which an enhanced coverage area exists. If it is determined that the user equipment does not support camping on an enhanced coverage cell, the user equipment may subsequently select the target cell by using a cell reselection condition provided in the prior art.

Figure 9:
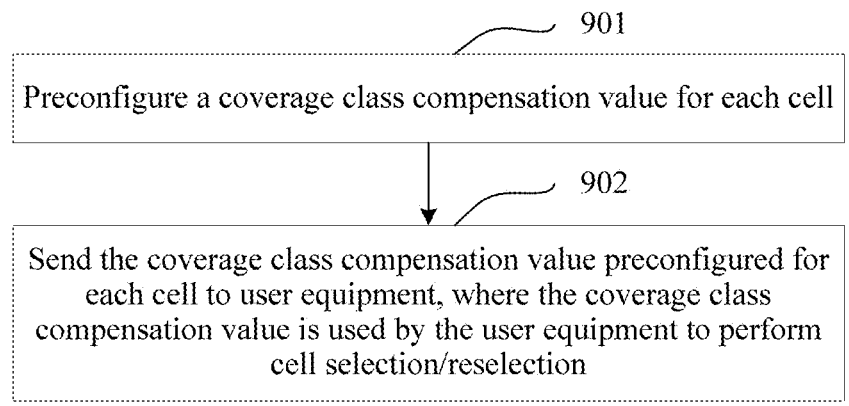
FIG. 9 is a flowchart of another cell selection method according to an embodiment of the present invention.

An embodiment of the present invention further provides a cell selection method. The method is executed by a network side. As shown in FIG. 9, the method includes the following steps.

Step 901: Configure a coverage class offset value for each cell.

Step 902: Send the coverage class offset value that is configured for each cell to user equipment, where the coverage class offset value is used by the user equipment to perform cell selection/reselection.

Optionally, the network side may preconfigure a coverage class offset value only for an enhanced coverage cell in the cells, and may not configure a coverage class offset value for a normal cell, that is, a coverage class offset value configured for a normal cell is a default value. Certainly, a coverage class offset value preconfigured for a normal cell may be zero. Certainly, a coverage class offset value may be preconfigured for each cell according to cases such as a bearer service of each cell or load on each cell during network planning and network optimization.

Specifically, the method further includes: configuring a reselection priority for each cell. The reselection priority may be sent to the user equipment in the following manners, so that the user equipment receives reselection priority information of the neighboring cells, and selects a target cell according to the reselection priority information of the neighboring cells.

In a first implementation manner, the network side may send the reselection priorities of the neighboring cells to the user equipment by using a broadcast message. Specifically, a parameter cellReselectionPriority may be set, and the reselection priorities of the neighboring cells may be sent to the user equipment by broadcasting a system information block (SIB) in a system message.

In a second implementation manner, a reselection priority is configured by the network side for each neighboring cell, and when the user equipment releases a radio resource, the reselection priority of each neighboring cell is sent to the user equipment by using a radio resource control (RRC) connection release message.

In a third implementation manner, the network side configures a neighboring cell list for the user equipment, and sends the neighboring cell list to the user equipment, where the neighboring cell list carries a neighboring cell identifier and reselection priority information.

The user equipment acquires, in the foregoing manner, priority information configured by the network side for each neighboring cell, where a reselection priority of an enhanced coverage cell included in the neighboring cells is lower than a reselection priority of a normal cell included in the neighboring cells. The user equipment selects the target cell according to measured signal quality of a camping cell, measured signal quality of the neighboring cells, acquired offset values of the camping cell and the neighboring cells, and the reselection priority information of the neighboring cells.

Figure 10:
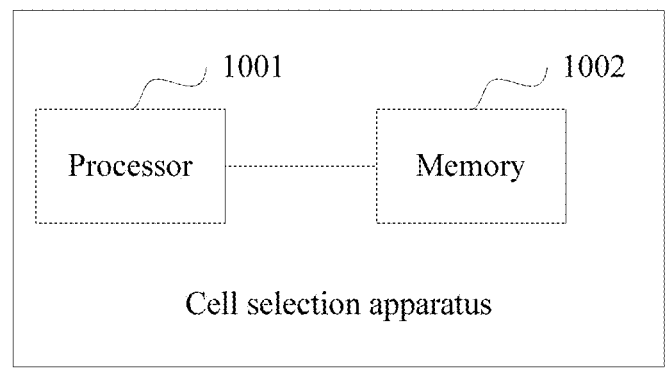
FIG. 10 is a schematic diagram of still another cell selection apparatus according to an embodiment of the present invention.

Based on a same invention concept as that of the foregoing cell selection method embodiments, an embodiment of the present invention further provides a cell selection apparatus. As shown in FIG. 10, the apparatus includes a processor 1001 and a memory 1002 connected to the processor 1001.

The memory 1002 is configured to store a program. Specifically, the program may include program code, and the program code includes a computer operation instruction. The memory 1002 may include a random access memory (RAM), and may further include a non-volatile memory (non-volatile memory), such as at least one magnetic disk memory.

The processor 1001 executes the program stored in the memory 1002, so as to implement the cell selection method shown in FIG. 7 of the present invention. The method includes: measuring signal quality of a cell, and acquiring a coverage class offset value that is preconfigured by a network side for each cell; where when the cell includes an enhanced coverage cell in which an enhanced coverage area exists and a normal cell in which an enhanced coverage area does not exist, the acquired coverage class offset value of the normal cell is zero or a default value; and selecting a target cell according to the measured signal quality of the cell and the acquired coverage class offset value of each cell.

Specifically, the selecting a target cell according to the measured signal quality of the cell and the acquired coverage class offset value of the cell includes: if the signal quality of the cell is greater than a signal quality threshold of the cell, using the cell as a cell that meets a coverage class cell selection condition, where the signal quality threshold of the cell is determined according to a minimum received signal threshold of the cell and the coverage class offset value of the cell; and using the cell that meets the coverage class cell selection condition as the target cell.

Optionally, the signal quality of the cell includes reference signal receive power value of the cell and a reference signal received quality value of the cell, and the coverage class cell selection condition meets the following formulas:

$S_{rxlev} > 0$, and $S_{qual} > 0$, where $$S_{rxlev} = Q_{rxlevmeas} - (Q_{rxlevmin} + Q_{rxlevminoffse} + Q_{coverageclassoffset}) - P_{compensation};\text{ and}$$

$$S_{qual} = Q_{qualmeas} - (Q_{qualmin} + Q_{qualminoffset} + Q_{coverageclassoffset});\text{ where}$$

Srxley represents a cell selection receive level, $Q_{rxlevmeas}$ represents a measured reference signal receive power value of the cell, $(Q_{rxlevmin} + Q_{rxlevminoffse} + Q_{coverageclassoffset}) - P_{compensation}$ represents a reference signal receive power threshold of the cell, $Q_{relevmin}$ represents a minimum required receive level in the cell, $Q_{rxlevminoffse}$ represents an offset of $Q_{relevmin}$, $Q_{coverageclassoffset}$ represents a coverage class offset value that is preconfigured by the network side for the cell, $P_{compensation}$ represents a maximum value between $(P_{EMAX} - P_{PowerClass})$ and 0, $P_{EMAX}$ represents maximum transmit power of user equipment performing uplink transmission, and $P_{PowerClass}$ represents maximum radio-frequency output power of the user equipment; and $S_{qual}$ represents a cell selection quality value, $Q_{qualmeas}$ represents a measured reference signal received quality value of the cell, $(Q_{qualmin} + Q_{qualminoffset} + Q_{coverageclassoffset})$ represents a measured reference signal received quality threshold of the cell, $Q_{qualmin}$ represents a minimum required quality level in the cell, $Q_{qualminoffset}$ represents an offset of $Q_{qualmin}$, and $Q_{coverageclassoffset}$ represents the coverage class offset value that is preconfigured by the network side for the cell.

Optionally, before the coverage class offset value that is preconfigured by the network side for the cell is acquired, it is determined that the user equipment supports camping on the enhanced coverage cell in which an enhanced coverage area exists.

A repeated description between this embodiment of the present invention and the cell selection method embodiment is not described.

Figure 11:
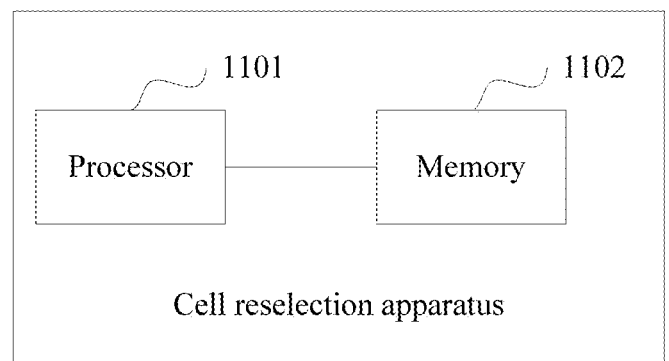
FIG. 11 is a schematic diagram of another cell reselection apparatus according to an embodiment of the present invention.

Based on a same invention concept as that of the foregoing cell reselection method embodiment, an embodiment of the present invention further provides a cell reselection apparatus. As shown in FIG. 11, the apparatus includes a processor 1101 and a memory 1102 connected to the processor 1101.

The memory 1102 is configured to store a program. Specifically, the program may include program code, and the program code includes a computer operation instruction. The memory 1102 may include a random access memory (RAM for short), and may further include a non-volatile memory, such as at least one magnetic disk memory.

The processor 1101 executes the program stored in the memory 1102, so as to implement the cell reselection method shown in FIG. 8 of the present invention. The method includes measuring signal quality of a camping cell in which user equipment is currently located and of neighboring cells of the camping cell, and acquiring coverage class offset values that are preconfigured by a network side for the camping cell and the neighboring cells. The method also includes selecting a target cell from the neighboring cells according to the measured signal quality of the camping cell and the neighboring cells, and the acquired coverage class offset values of the camping cell and the neighboring cells.

A repeated description between this embodiment of the present invention and the cell reselection method embodiment is not described.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, comprising:
   measuring, by a device, signal quality of a camping cell in which user equipment is currently located and signal qualities of neighboring cells of the camping cell;
   acquiring, by the device, a coverage class offset value for the camping cell and coverage class offset values for the neighboring cells from a network device;
   acquiring, by the device, reselection priority information from the network device for each neighboring cell of the neighboring cells, wherein a reselection priority of an enhanced coverage cell in which an enhanced coverage area exists is lower than a reselection priority of a normal cell in which an enhanced coverage area does not exist, and the enhanced coverage cell and the normal cell are comprised in the neighboring cells; and
   selecting, by the device, a target cell from the neighboring cells according to the signal quality of the camping cell, the signal qualities of the neighboring cells, the coverage class offset value of the camping cell, the coverage class offset values of the neighboring cells, and the reselection priority information of the neighboring cells.

2. The method according to claim 1, wherein selecting the target cell from the neighboring cells comprises:
   in response to determining that the neighboring cells comprise neighboring cells whose reselection priorities are higher than a reselection priority of the camping cell, selecting a first neighboring cell from the neighboring cells that meets a first coverage class cell selection condition as the target cell, wherein the first coverage class cell selection condition is that the signal quality of the first neighboring cell is greater than a signal quality threshold of the first neighboring cell, and the signal quality threshold of the first neighboring cell is determined according to a minimum received signal threshold of the first neighboring cell and a coverage class offset value of the first neighboring cell; or
   in response to determining that no neighboring cell whose reselection priority is higher than a reselection priority of the camping cell meets a second coverage class cell selection condition or determining that the neighboring cells do not comprise a neighboring cell whose reselection priority is higher than a reselection priority of the camping cell, and in response to determining that the signal quality of the camping cell is lower than a specified threshold within a specified time interval:
- selecting a second neighboring cell that meets the second coverage class cell selection condition from the neighboring cells whose reselection priorities are not higher than the reselection priority of the camping cell; and
- in response to the second neighboring cell meeting a coverage class cell reselection condition, using the second neighboring cell as the target cell, wherein the coverage class cell reselection condition is that a signal quality level of the second neighboring cell is greater than a signal quality level of the camping cell within the specified time interval, the signal quality level of the second neighboring cell is determined according to the signal quality of the second neighboring cell and the coverage class offset value of the second neighboring cell, and the signal quality level of the camping cell is determined according to the signal quality of the camping cell and the coverage class offset value of the camping cell.

3. The method according to claim 1, wherein when the camping cell and the neighboring cells comprise an enhanced coverage cell in which an enhanced coverage area exists and a normal cell in which an enhanced coverage area does not exist, a coverage class offset value for the normal cell is zero or a default value.

4. The method according to claim 1, wherein before acquiring coverage class offset values for the neighboring cells, the method further comprises:
- determining that the user equipment supports camping on an enhanced coverage cell in which an enhanced coverage area exists.

5. The method according to claim 1, further comprising: configuring, by the network device, coverage class offset values for the camping cell and the neighboring cells.

6. An apparatus, comprising:
a processor coupled to a non-transitory memory, wherein the non-transitory memory stores instructions that are executable by the processor, and wherein the instructions comprise instructions for:
- measuring signal quality of a camping cell in which user equipment is currently located and signal qualities of neighboring cells of the camping cell;
- acquiring a coverage class offset value for the camping cell and coverage class offset values for the neighboring cells from a network device;
- acquiring reselection priority information from the network device for each neighboring cell of the neighboring cells, wherein a reselection priority of an enhanced coverage cell of the neighboring cells in which an enhanced coverage area exists is lower than a reselection priority of a normal cell of the neighboring cells in which an enhanced coverage area does not exist; and
- selecting a target cell from the neighboring cells according to the signal quality of the camping cell, the signal qualities of the neighboring cells, the coverage class offset value of the camping cell, the coverage class offset values of the neighboring cells, and the reselection priority information of the neighboring cells.

7. The apparatus according to claim 6, wherein the instructions comprise instructions for:
- in response to determining that the neighboring cells comprise neighboring cells whose reselection priorities are higher than a reselection priority of the camping cell, selecting a first neighboring cell from the neighboring cells that meets a first coverage class cell selection condition as the target cell, wherein the first coverage class cell selection condition is that the signal quality of the first neighboring cell is greater than a signal quality threshold of the first neighboring cell, and the signal quality threshold of the first neighboring cell is determined according to a minimum received signal threshold of the first neighboring cell and a coverage class offset value of the first neighboring cell; or
- in response to determining that no neighboring cell whose reselection priority is higher than a reselection priority of the camping cell meets a second coverage class cell selection condition, or in response to determining that the neighboring cells do not comprise a neighboring cell whose reselection priority is higher than a reselection priority of the camping cell, and in response to determining that the signal quality of the camping cell is lower than a specified threshold within a specified time interval:
  - selecting a second neighboring cell that meets the second coverage class cell selection condition from the neighboring cells whose reselection priorities are not higher than the reselection priority of the camping cell; and
  - in response to the second neighboring cell meeting a coverage class cell reselection condition, using the second neighboring cell as the target cell, wherein the coverage class cell reselection condition is that a signal quality level of the second neighboring cell is greater than a signal quality level of the camping cell within the specified time interval, the signal quality level of the second neighboring cell is determined according to the signal quality of the neighboring cell and the coverage class offset value of the second neighboring cell, and the signal quality level of the camping cell is determined according to the signal quality of the camping cell and the coverage class offset value of the camping cell.

8. The apparatus according to claim 6, wherein when the camping cell and the neighboring cells comprise an enhanced coverage cell in which an enhanced coverage area exists and a normal cell in which an enhanced coverage area does not exist, a coverage class offset value for the normal cell is zero or a default value.

9. The apparatus according to claim 6, wherein the instructions comprise instructions for:
- determining that the user equipment supports camping on an enhanced coverage cell in which an enhanced coverage area exists.

10. A non-transitory computer-readable storage medium comprising instructions that are executable by a processor, the instructions including instructions for:
- measuring signal quality of a camping cell in which user equipment is currently located and signal qualities of neighboring cells of the camping cell;
- acquiring a coverage class offset value for the camping cell and coverage class offset values the neighboring cells from a network device;
- acquiring reselection priority information from the network device for each neighboring cell of the neighboring cells, wherein a reselection priority of an enhanced coverage cell in which an enhanced coverage area exists is lower than a reselection priority of a normal cell in which an enhanced coverage area does not exist, and the enhanced coverage cell and the normal cell are comprised in the neighboring cells; and selecting a target cell from the neighboring cells according to the signal quality of the camping cell, the signal qualities of the neighboring cells, the coverage class offset value of the camping cell, the coverage class offset values of the neighboring cells, and the reselection priority information of the neighboring cells.

11. The non-transitory computer-readable storage medium according to claim 10, wherein the instructions comprise instructions for:

in response to determining that the neighboring cells comprise neighboring cells whose reselection priorities are higher than a reselection priority of the camping cell, selecting a first neighboring cell from the neighboring cells that meets a first coverage class cell selection condition as the target cell, wherein the first coverage class cell selection condition is that the signal quality of the first neighboring cell is greater than a signal quality threshold of the first neighboring cell, and the signal quality threshold of the first neighboring cell is determined according to a minimum received signal threshold of the first neighboring cell and a coverage class offset value of the first neighboring cell; or in response to determining that no neighboring cell whose reselection priority is higher than a reselection priority of the camping cell meets a second coverage class cell selection condition or in response to determining that the neighboring cells do not comprise a neighboring cell whose reselection priority is higher than a reselection priority of the camping cell, and in response to determining that the signal quality of the camping cell is lower than a specified threshold within a specified time interval:

selecting a second neighboring cell that meets the second coverage class cell selection condition from the neighboring cells whose reselection priorities are not higher than the reselection priority of the camping cell; and in response to the second neighboring cell meeting a coverage class cell reselection condition, using the second neighboring cell as the target cell, wherein the coverage class cell reselection condition is that a signal quality level of the second neighboring cell is greater than a signal quality level of the camping cell within the specified time interval, the signal quality level of the second neighboring cell is determined according to the signal quality of the second neighboring cell and the coverage class offset value of the second neighboring cell, and the signal quality level of the camping cell is determined according to the signal quality of the camping cell and the coverage class offset value of the camping cell.

* * * * *